United States Patent

Ferris et al.

[15] 3,647,248
[45] Mar. 7, 1972

[54] KINGPIN LOCK AND INDICATOR FOR FIFTH WHEEL PLATE

[72] Inventors: Ray L. Ferris, Thornton; John H. Spence, Chicago Heights, both of Ill.

[73] Assignee: Pullman Incorporated, Chicago, Ill.

[22] Filed: Sept. 24, 1970

[21] Appl. No.: 75,034

[52] U.S. Cl. .........................287/20.5 R, 280/434, 248/119
[51] Int. Cl. ...........................................................F16d 9/00
[58] Field of Search ................248/119 S; 287/20.5 R, 20 R; 280/434, 435; 105/368 S

[56] References Cited

UNITED STATES PATENTS

| | | | |
|---|---|---|---|
| 1,981,233 | 11/1934 | Harris | 280/434 |
| 2,977,137 | 3/1961 | Durham | 280/434 |
| 3,484,124 | 12/1969 | Wille | 287/20 R |
| 3,513,804 | 5/1970 | Yeates et al. | 287/20 R X |

*Primary Examiner*—Andrew V. Kundrat
*Attorney*—Hilmond O. Vogel and Richard J. Myers

[57] ABSTRACT

A fifth wheel plate for a trailer hitch includes a locking mechanism which is adapted to lock a kingpin receiving jaw in a closed position. The locking mechanism includes an indicating member which when the locking means is unlocked projects outwardly with respect to the fifth wheel plate so as to be readily visible. When the jaws are locked about a kingpin the indicator is recessed into the fifth wheel plate so that it is substantially removed from view. A rod is positioned in the path of the kingpin jaw during its movement to a closed position and engages the kingpin whereupon the actuating rod moves a latch mechanism out of the way of the locking mechanism so that it can move to its jaw locking position. If the kingpin is not within the jaw in proper position the latch mechanism prevents the locking mechanism from closing and thus remains in the position indicating that proper locking has not been accomplished.

5 Claims, 6 Drawing Figures

INVENTORS
RAY L. FERRIS
JOHN H. SPENCE
BY Edward O. Vogel
ATT'Y.

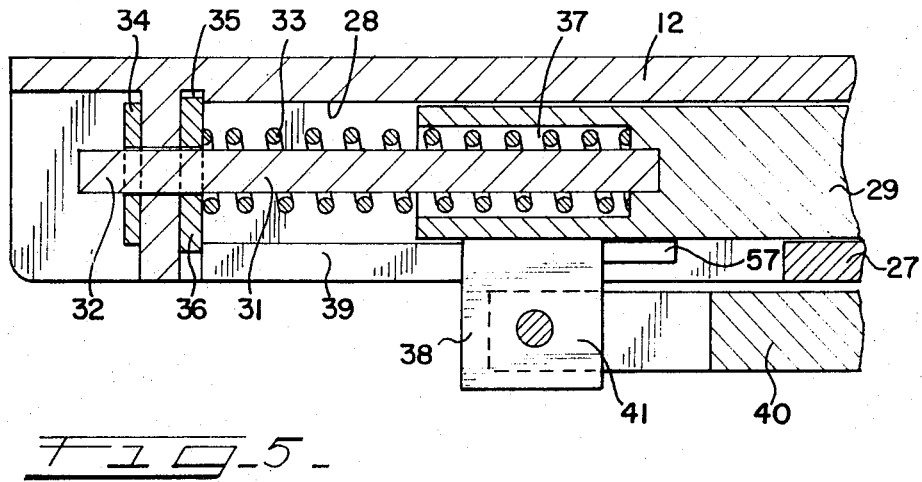
Fig-5-
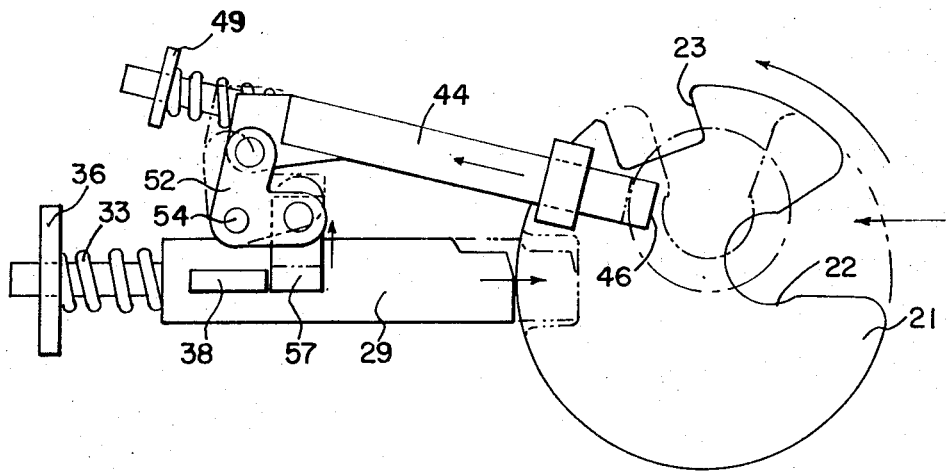
Fig-6-

KINGPIN LOCK AND INDICATOR FOR FIFTH WHEEL PLATE

SUMMARY

The present invention is an improvement over the Wille et al. U.S. Pat. No. 3,358,955, which is incorporated herein by reference. This patent shows a substantially similar locking mechanism for locking a rotating kingpin receiving jaw in a closed position. In the operation of fifth wheel plates for trailer hitches of the type which may be used for supporting a trailer on railway flat car, it is possible during the engagement of the trailer kingpin with the jaw that the kingpin is not properly positioned within the slot and jaw means of the fifth wheel plate. While in the aforementioned patent, the locking means indicates when the jaws are closed, it is possible that during a failure in the hitching operation that the jaws close and yet the kingpin might not be seated or improperly seated within the jaws of the fifth wheel plate. Thus, the locking mechanism would indicate that the jaws are closed and yet the kingpin may be improperly seated resulting in the possibility of the trailer breaking loose from the trailer hitch during train operations.

The present invention provides a single lock which indicates that the locking mechanism is properly locked and also that the kingpin is in place. This is achieved by a single locking means combined with an actuating mechanism which prevents the locking means from entering into a locked relation with respect to the jaw means if the kingpin is not properly seated. The actuating means includes a bar which is disposed in the path of movement of the kingpin and jaw when the the kingpin and jaw are moved into locked relation. Upon such relation the kingpin engages the end of the actuating means or bar which in turn functions to mechanically displace a latch from the path of movement of the locking mechanism and thus the locking mechanism is able to function to lock the jaws about the kingpin since the kingpin is properly seated within the jaws. The single indicating means thus serves two functions, that of indicating that the jaws are properly locked and also indicating that the kingpin is in place since otherwise the jaws could not move to their locked position. Thus the operator need observe only one indicator to know that the proper connection of hitching is achieved.

BRIEF DESCRIPTION OF THE DRAWINGS

FIG. 3 is a side elevational view of a fifth wheel plate disposed in an upright position and having certain portions broken away;

FIG. 5 is a cross-sectional view taken substantially along the line 5—5 of FIG. 4; and FIG. 6 is a schematic view of a kingpin locking mechanism and indicating means.

DETAILED DESCRIPTION

Figure 1:
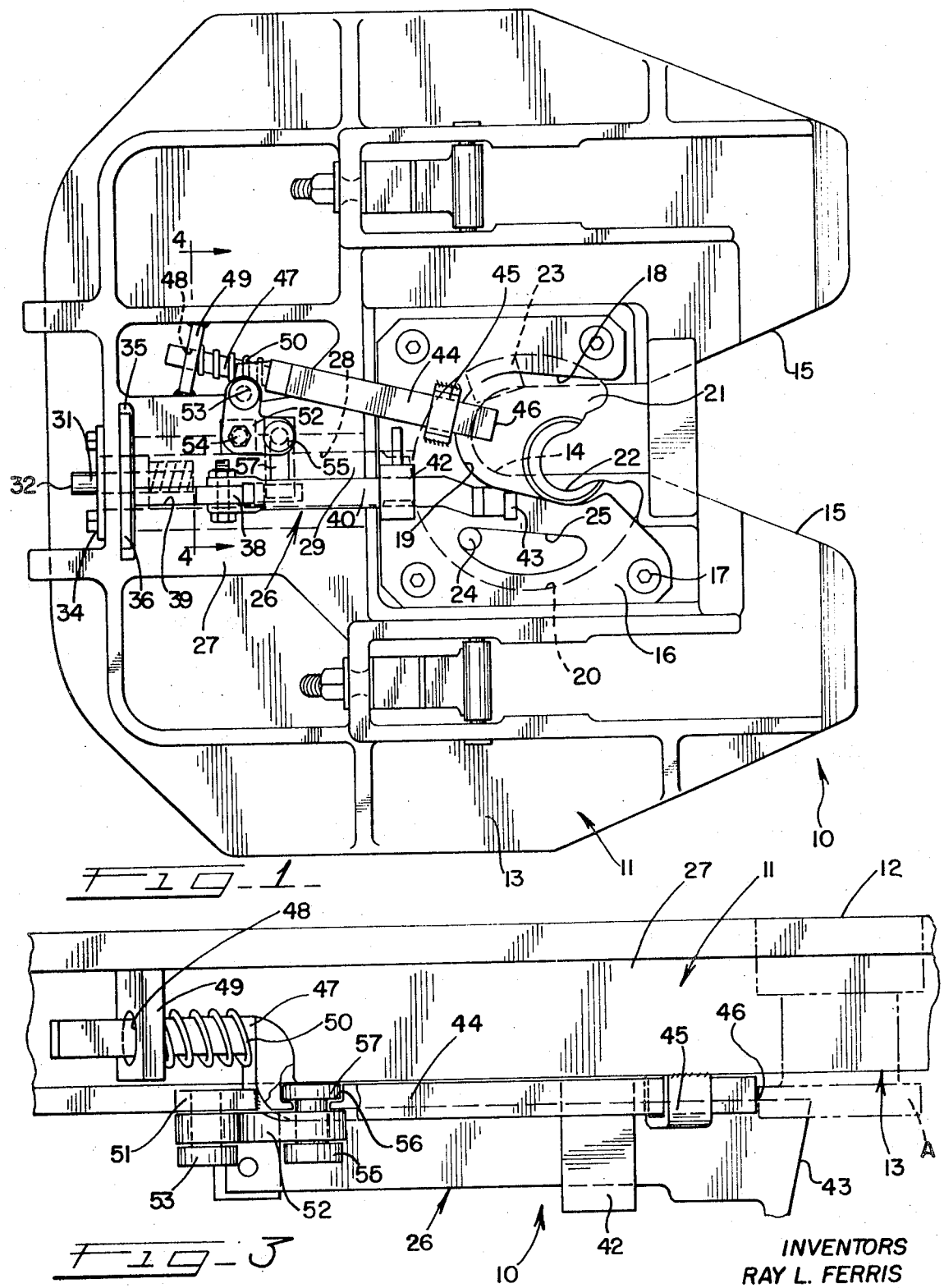
FIG. 1 is a plan view of a fifth wheel plate viewing the underneath side of said plate.

Referring now particularly to FIG. 1, a trailer hitch 10 comprises a fifth wheel plate 11 having an upper surface 12 and a lower surface 13. The fifth wheel plate 11 is of generally conventional construction including a slot 14 open at its forward end and including a pair of converging vertical gathering surfaces 15. A block 16 is secured to the underneath surface 13 by a plurality of bolts 17. The block 16 also includes an open end slot 18 substantially vertically aligned with the slot 14. The slot 18 is also provided at its closed end with an arcuate portion 19. The plate 11 is also provided with a cylindrical cavity 20 in which a cylindrical jaw 21 is rotatably positioned. The cylindrical jaw 21 is provided with a kingpin receiving open end slot 22 for receiving in conventional fashion the kingpin of a trailer. The outer peripheral edge of the jaw 21 also includes a notch or rectangular recess 23. A vertical stop pin 24 connected to the jaw 21 is slidably disposed within a stop slot 25 provided in the block 16.

Figure 4:
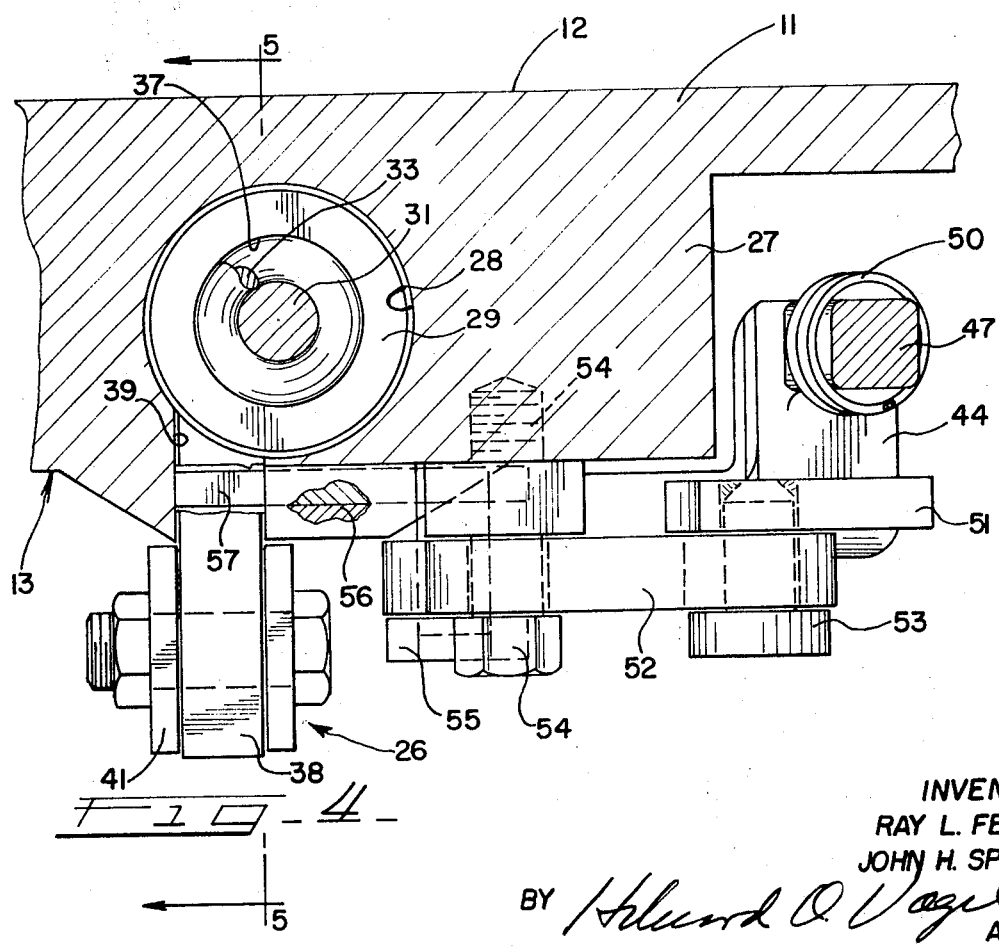
FIG. 4 is a view taken substantially along the line 4—4 of FIG. 1 with the fifth wheel plate, however, placed in a normal operating position.

A jaw locking mechanism is generally designated by the reference character 26. The lower surface 13 of the plate 11 is provided with a section of relatively large thickness designated at 27. As best shown in FIG. 4, the section 27 includes a longitudinally extending horizontal passage 28 in which a lock bar 29 is slidingly disposed. The lock bar 29 is provided at its forward end with a portion 30 which is adapted to engage the rectangular recess 23 for locking the jaw 21 against rotation. A pin 31, as best shown in FIGS. 1 and 5, projects outwardly from an outer vertical surface of the section 27 in the open position of the jaw 21 and is provided at its end with an indicator 32 which may be suitably painted to be readily visible to the operator. As best shown in FIG. 5, a spring 33 is positioned about the pin 31. A guide plate 34 is secured to the section 27 through which the pin 31 is slidable. The section 27 also includes a recess 35 in which a stop plate 36 is secured. The spring 33 is positioned against the stop plate 36 as shown in FIG. 5 and is also disposed within a recess 37 provided in the sliding lock bar 29. Thus the lock bar 29 is biased in a direction toward the recess 23 of the jaw 21. A depending lug 38 is connected to the sliding lock bar 29 and is movable within a slot 39 provided in the section 27 beneath the passage 28 as also shown in FIG. 4.

A release bar or lever 40 is provided at one end with a clevis 41 pivotally connected to the depending lug 38 and is slidingly movable in a guide 42 depending from the lower surface 13. The lever 40 is provided at its end with a face portion 43 which is adapted to be engaged by a suitable tripping lever for moving the release bar 40 in a direction rearwardly away from the jaw 21.

The aforementioned H. S. Wille et al. patent shows a substantially similar locking mechanism which has hereinabove been described with the release lever which is actuated when it is desired to collapse the trailer hitch to a nonuse position and to disengage the kingpin from the kingpin slot of the locked jaw. The Wille et al. patent also includes the identical locking mechanism and indicating means to indicate that the jaw has been properly locked.

Figure 2:
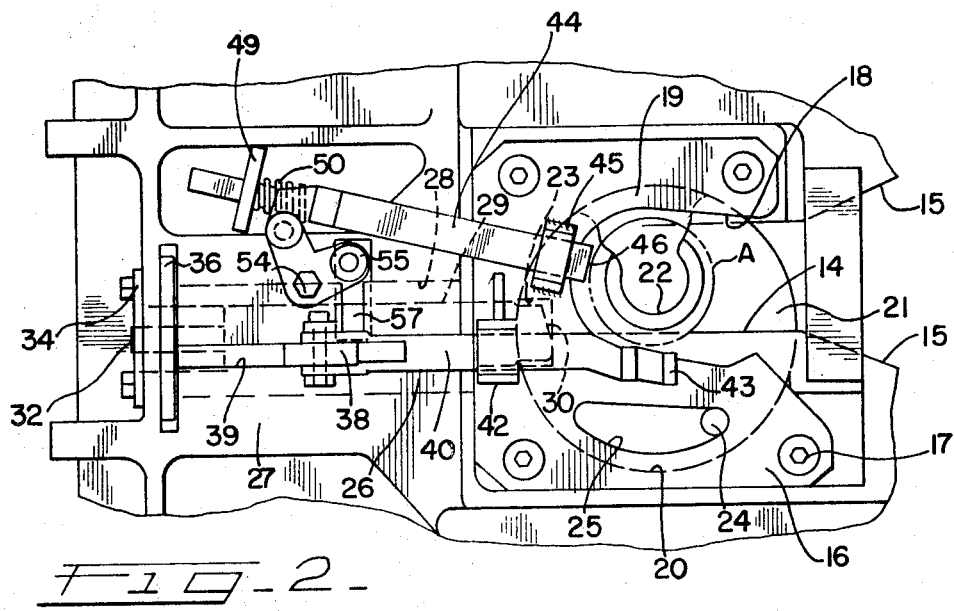
FIG. 2 is a fragmentary view similar to FIG. 1 showing a closed position of a kingpin jaw and related mechanism.

The aforementioned locking arrangement with the present invention includes, as best shown in FIGS. 1, 2 and 4, an actuating bar 44 which is slidable through a guide 45 connected to the block 16. The actuating bar 44 also includes an actuating end 46 which, as best shown in FIG. 3, is adapted to be engaged by a kingpin schematically shown and designated by the letter A. The actuating bar 44 is provided at its other end with a gooseneck portion 47 which is slidable through a bore 48 provided in a guide element 49 connected to the underneath surface 13 of the plate 11. A spring 50 on the gooseneck portion 47 urges the actuating bar 44 in a direction toward the kingpin receiving slot 22. A plate 51 is welded to the gooseneck portion 47 and actuating bar 44 and projects outwardly with respect thereto. The plate 51 is pivotally connected to one end of a bellcrank 52 by means of a pivot pin 53. The bellcrank 52 is rotatable about a fixed pivot member 54 supported in the section 27 as best shown in FIG. 4. A pivot pin 55 connected to the other end of the bellcrank 52 is also pivotally connected to a slide latch member 57 which as best shown in FIGS. 2, 3, 4, and 5, slides within a transversely extending recess 56 formed in the section 27.

THE OPERATION

As fully disclosed in the aforementioned Wille patent the fifth wheel plate 11 is particularly adapted for utilization with a trailer hitch of the type which supports trailers on the flat decks of railway cars. Trailer hitches of this type are operative in an erect position and are usually collapsed on the floor of the car when not in use. In the connection of the trailer to the fifth wheel plate, the kingpin A enters into the kingpin slot 14 which thereupon causes rotation of the cylindrical jaw 21. The jaw 21 rotates until the kingpin rotates from the position shown in FIG. 1 to the position of FIG. 2, wherein the kingpin A engages the end portion 46 of the actuating bar 44 pushing the same against the spring 50 and moving the bellcrank 52 from the position shown in FIG. 1 to the position shown in FIG. 2. In the FIG. 1 position of the bellcrank 52 the latch member 57 is disposed across the slot 39, as shown in FIGS. 1, 4, and 5 and in the path of movement of the depending lug 38 whereby the locking bar 29 is restrained from being urged into its locking position. However, as the actuating bar 44 is moved to the position shown in FIG. 2, the bellcrank 52 withdraws the latch 57 from the said restraining or blocking relation and the locking bar 29 is then urged into the recess 23 as shown in FIG. 2, to securely lock the jaw 21 against rotation or unlocking. It will be noted in FIG. 2 that the indicating end 32 of the pin 31 is drawn substantially into a flush relation relative to the guide plate 34 so that it is substantially no longer visible and this indicates to the operator that the locking mechanism 26 has locked the jaw 21 in the closed position and at the same time it indicates to the operator that the kingpin A is properly in place within the jaw 21. Thus a single indicator is operative to indicate to the operator that not only is the jaw 21 locked against rotation but that the kingpin is in proper position within the jaw. This of course is accomplished due to the fact that the actuating bar 44 will not move if the kingpin A is improperly placed or is not within the jaw 21, and since this lack of actuation in such condition will preclude the latch member 57 from being moved from the unlatched position, as shown in FIG. 2, relative to the depending lug 38 but will instead remain in the restraining position even though the jaw 21 may be in position wherein the recess 23 is ready to receive the locking bar 29. The locking bar 29 cannot move as long as the latch 57 is in the restraining position indicating that the kingpin A is not in place. However, once the locking bar 29 is in position, it is known that the kingpin is properly seated within the kingpin receiving slot 22.

Thus with one conventional locking arrangement and fifth wheel plate of the type shown in the aforementioned Wille patent and by the combination of the actuating rod 44 and its bellcrank mechanism 52 an effective arrangement has been provided which will provide a single indicator telling the operator whether or not the kingpin is properly seated and whether or not the lock has achieved a locking function.

What is claimed is:

1. A trailer hitch including a fifth wheel plate having movable jaw means engageable with a trailer kingpin, a locking arrangement including a sliding lock bar resiliently biased to engage said jaw means to lock the same in closed kingpin engagement, said lock bar including indicating means in one position indicating said closed engagement and in another position indicating opening of said jaw means, the improvement comprising:

an actuating bar slidingly carried on said plate having an end portion positioned adjacent said jaw means and in the path of movement of said kingpin into said jaw means, spring means urging said actuating bar toward said jaw means, link means rotatably mounted on said plate, first pivot means connecting one end of said link means to said actuating bar, a stop member positioned on said plate for relative reciprocating movement, second pivot means connecting the other end of said link means to said stop member, said stop member operatively engaging said lock bar to restrain said lock bar from movement toward its engaging and locking position relative to said jaw means during the absence of a kingpin within said jaw means, said actuating bar being movable during engagement of said end portion by a kingpin within said jaw whereby said stop member is moved from operative engagement with said lock bar and said lock bar is biased into locking engagement with said jaw means.

2. The invention in accordance with claim 1,
said link means comprising a bellcrank.

3. The invention in accordance with claim 2,
said lock bar having a vertically extending lug engaged by said stop member to restrain the same against locking relation.

4. The invention in accordance with claim 2,
said jaw means including a rotatable cylindrical member having a kingpin-receiving slot eccentrically positioned therein,
means supporting said cylindrical member for rotating movement on said plate,
said end portion of said actuating bar being disposed eccentrically relative to the axis of rotation of said cylindrical member and in the path of movement of a kingpin disposed in said slot.

5. The invention in accordance with claim 1,
said indicating means indicating closed position of said jaws being withdrawn substantially within said fifth wheel plate and in the unlocked position of said jaw means or in the absence of a kingpin within said jaw means, projecting outwardly relative to said plate.

* * * * *